United States Patent [19]
DuRocher

[11] Patent Number: 5,313,028
[45] Date of Patent: May 17, 1994

[54] TURN SIGNAL CANCEL MECHANISM

[75] Inventor: Daniel J. DuRocher, Leonard, Mich.

[73] Assignee: ITT Corporation, New York, N.Y.

[21] Appl. No.: 908,683

[22] Filed: Jul. 2, 1992

[51] Int. Cl.$^5$ .................. H01H 3/18; H01H 3/16
[52] U.S. Cl. .................. 200/61.27; 200/61.34
[58] Field of Search ....... 200/61.27, 61.3, 61.31–61.35

[56] References Cited
U.S. PATENT DOCUMENTS

| | | | |
|---|---|---|---|
| 4,036,817 | 7/1977 | Wilkinson | 200/61.27 |
| 4,503,296 | 3/1985 | Iwata et al. | 200/61.27 |

Primary Examiner—A. D. Pellinen
Assistant Examiner—Michael A. Friedhofer
Attorney, Agent, or Firm—Dykema Gossett

[57] ABSTRACT

An improved turn signal cancel mechanism for a vehicle. The cancel mechanism uses a dual finger cancel pawl which rotates into and out of the necessary operational position for contact with a cancelling member of a vehicle's steering column. The cancel mechanism obviates the need for a complicated centering system and also lessens the amount of force required by restoring plungers which results in less operational noise, easier assembly and more reliable operation.

17 Claims, 3 Drawing Sheets

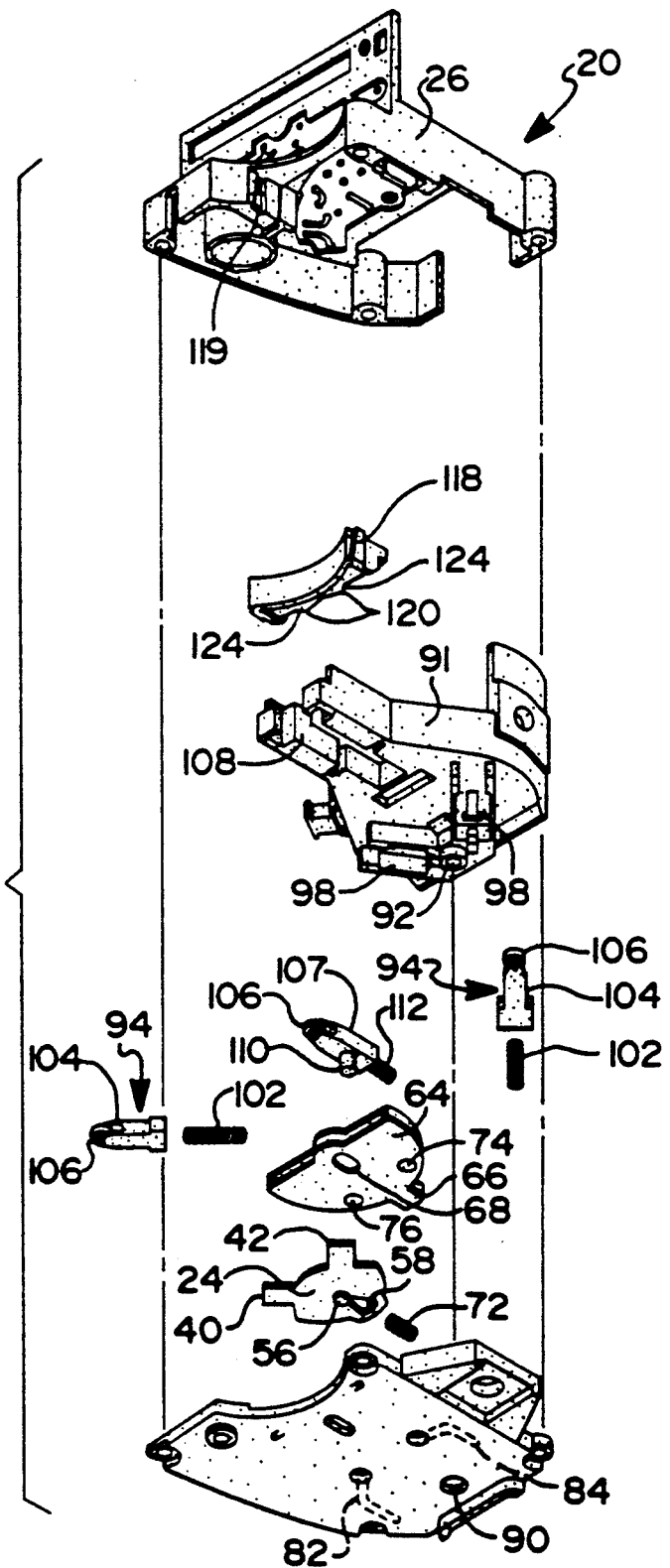

TURN SIGNAL CANCEL MECHANISM

BACKGROUND OF THE INVENTION

This invention relates to an improved turn signal cancel mechanism for cancelling an actuated turn signal of a vehicle once the turn signal has been placed in one of two actuated positions by the vehicle operator.

As is well-known, a turn signal arm is used by a vehicle operator to actuate turn signals to signal a turn. When the turn is complete, the steering wheel is returned to its normal position and a turn signal cancel mechanism acts to return the turn signal arm back to its neutral or normal position, deactivating the turn signals. Additionally, the turn signal cancel mechanism must be able to hold the signal arm in the signalling position as the steering wheel is turned in the direction of the turn, this ability is referred to as bypass, and the turn signal mechanism must be able to yield if the turn signal arm is manually held in position and the steering wheel is turned in the cancel direction, that is opposite to the direction of the turn, so that the cancel mechanism is not damaged, this ability is referred to as jam cancel.

There are various types of signal cancel mechanisms that perform the above functions. Typically, they can be divided into two different groups, force cancel mechanisms and trip cancel mechanisms. The difference between these two types is the manner in which the restoring force is achieved to return the signal arm to the neutral position. Basically, force cancel mechanisms rely upon the geometry of the detent that holds the signal arm in place to restore the signal mechanism to the neutral position when the detent is forced from its holding position. Trip cancel mechanisms use stored energy from springs to restore the signal arm to the neutral position when the detent is tripped. Both of these cancel mechanisms have in the past typically used a single finger cancelling pawl. The pawl protrudes into the path of a cancelling member located on a vehicle's steering column. As the signaled turn is made, the cancel mechanism is in the bypass mode and when the turn is completed, the pawl is moved to cancel the turn signal and the turn signal arm returns to its neutral position with the pawl being retracted with respect to the steering column.

In an effort to more fully describe the operation of a typical cancel mechanism, a trip cancel mechanism will be described in more detail. It should be understood that this is merely one example of one type of cancel mechanism and particularly a type of trip cancel mechanism.

This example of a trip cancel mechanism includes a pivot assembly to which the signal arm is mounted. The pivot assembly includes a pair of restoring plungers to bias the pivot assembly to the normal position and a latching plunger which selectively latches the pivot mechanism in a desired signalling position. The latching is done by the interaction of the latching plunger with a latching or action form that has detents which are engaged by the latching plunger. The latching plunger is operatively connected to the single finger cancel pawl so that they can function responsively. For example, when the latching plunger is in a latched position, one end of the cancelling pawl can engage the plunger so that as the pawl is moved the latching plunger is moved from the detent.

The cancel pawl of this example is pivotally and reciprocally mounted in the cancel mechanism and has springs for urging the pawl outwardly and for aligning the pawl. A locating pin extends from the pawl and engages a locating ramp that is mounted to the end of the turn signal arm. The ramp is V-shaped with the apex being farther away from the steering column than the base of the V. The locating pin rides along the ramp in response to movement of the ramp by the turn signal arm. In the neutral position, the pin is at the apex of the V and the pawl is retracted with respect to the steering column. When a turn is signaled, the ramp moves and the pin rides along the ramp to the base of the V allowing the cancel pawl to extend out into the path of the cancelling member on the steering column. Simultaneously, the outer end of the latching plunger engages one of the detents in the latching form. The interaction between the latching plunger and the latching form is sufficient to overcome the biasing action of the restoring plungers so that the signal arm remains in the desired position.

At least one shoulder or a lobe of a cancelling member associated with the vehicle's steering column is adapted to come into contact with the finger of the cancel pawl. When the cancelling member rotates in a cancelling direction, the interaction of the finger with the cancelling member causes the cancel pawl to move and contact the latching plunger and trips it, dislodging it from the detent in the latching form. The biasing force of the restoring plungers returns the signal arm to the normal position and the finger is retracted within the turn signal cancel mechanism by movement of the ramp. When the cancelling member rotates in a non-cancelling direction, i.e., in the direction of the desired turn, the cancel pawl pivots slightly but does not trip the latching plunger, i.e., it is in the bypass mode.

One of the disadvantages of both types of turn signal cancel mechanisms is the amount of restoring force required to restore the turn signal arm to the neutral position. With reference to the trip mechanism just described, it requires sufficient spring force to be stored in the restoring plungers to pivot the signal arm back to neutral and to retract the cancel pawl against the bias of the springs attached to the cancelling pawl. With greater restoring forces there are numerous adverse effects, 1) there is more noise in the cancel mechanism when it is operated, 2) the tactiles of the system are adversely effected, 3) there is greater effort required to move the turn signal arm when making a turn, and 4) the system is restored to neutral at greater velocities which can result in damage to the system or a shortening of the mechanisms life. The same problems can occur in force cancel mechanisms due to the use of a single finger cancel pawl that is retracted into the cancel mechanism when the turn signal arm is in the neutral position.

The trip cancel unit described is also difficult to assemble. It can be difficult to properly locate the spring loaded cancel pawl with respect to the ramp in the mechanism. Further, there can be problems if the cancel pawl is not properly located with respect to the ramp or the springs do not properly bias the pawl which can result in the pawl not properly retracting creating noise problems and potential damage to the mechanism.

SUMMARY OF THE INVENTION

The present invention discloses an improved turn signal cancel mechanism that overcomes the above problems. Briefly, the improved cancel mechanism employs a cancel pawl that is strictly rotational in its operation. There is a two finger cancel pawl that rotates between the cancelling position wherein the finger can be contacted by the cancelling member on the steering column and a neutral position wherein the finger is out of the way of the cancelling member. The improved system does not require the centering springs that were necessary in the above described cancel mechanism resulting in less restoring force being required. Further, the ability to pivot out of the way rather than having to be retracted requires less force which is a benefit. The improved cancel mechanism is quieter, easier to operate, has less affect on overall switch tactiles, less prone to damage, operates at less velocity, is easier to assemble and has less potential for operational problems.

One of the major features of the present invention is the presence of a dual finger cancel pawl. Formed with two fingers approximately at right angles, a finger is smoothly and quietly rotated into the proper orientation rather than using a complicated and noisy retraction scheme. It is just as easily rotated back to a neutral position within the turn signal cancel mechanism itself.

In the disclosed embodiment of the turn signal cancel mechanism, there is a pivot assembly which is adapted to be pivotally mounted with respect to the vehicle steering assembly and is adapted to receive the turn signal arm for manual movement of the pivot assembly between a normal position and signaling positions. This pivot assembly is urged back to the normal position by restoring means, but when in the signaling position, is held by a latching means. The cancelling pawl releases the latching means so that the pivot assembly can be restored to the normal position by the restoring means. The cancelling pawl includes first and second cancelling fingers that are adapted to be engaged by the steering assembly. The cancelling fingers are pivotally mounted for movement between first and second positions corresponding to the signaling positions and a third position corresponding to the normal position. The pivot assembly and cancelling pawl are operatively coupled so that when the pivot assembly is latched in one of the signaling positions, one of the cancelling fingers is pivoted to the first or second position and adapted to be engaged by the steering assembly. The latching means is released by rotation of the cancelling fingers with the pivot assembly being restored to the normal position after rotation of the cancelling fingers.

BRIEF DESCRIPTION OF THE DRAWINGS

FIG. 4 is an exploded perspective view of the improved turn signal cancel mechanism according to the present invention.

DETAILED DISCLOSURE OF A PREFERRED EMBODIMENT

Figure 1:
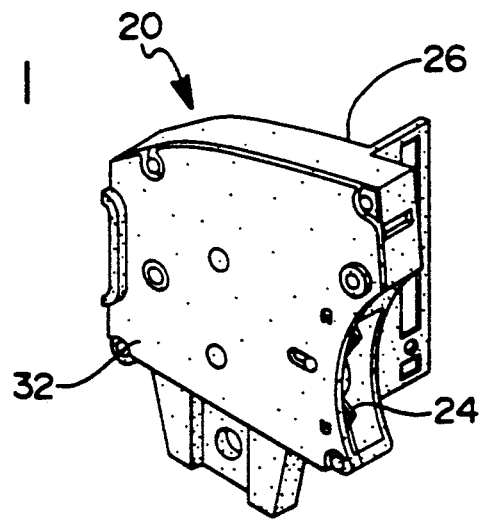
FIG. 1 is a perspective view of the improved turn signal cancel mechanism according to the present invention.

FIG. 1 illustrates the turn signal cancel mechanism 20 of the present invention. It includes a front base cover 22, a dual finger cancel pawl 24, and a back insert housing 26. It is adapted to be pivotally mounted with respect to a vehicle steering assembly and adapted to receive a turn signal arm.

Figure 2:
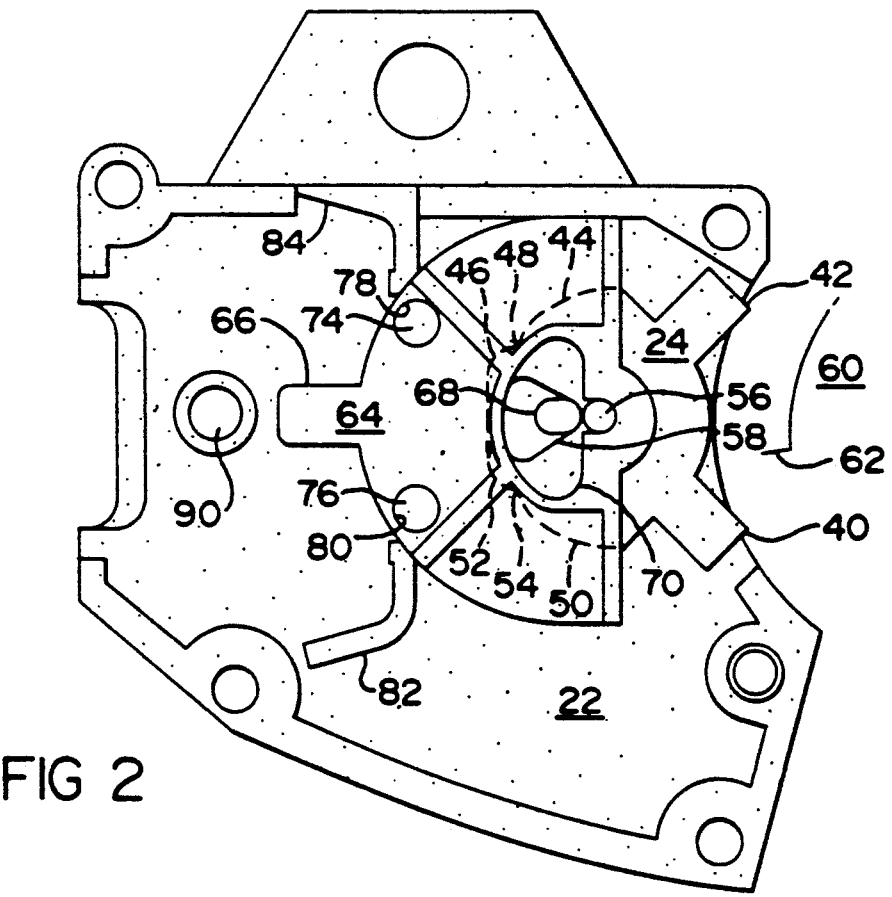
FIG. 2 is an end view of a portion of the present invention including the front base cover, cancel pawl enclosure, and the dual finger cancel pawl.

FIG. 2 shows a portion of turn signal cancel mechanism 20. Dual finger cancel pawl 24 is shown in the normal or neutral position. The forward outer periphery of dual finger cancel pawl 24 includes two fingers 40 and 42 extending outwardly away from the main body at approximately right angles to each other. The rearward outer periphery includes two arc shaped ramps 44 and 46 intersecting at a point 48 generally opposite from finger 40. Similarly, inwardly running arc shaped ramps 50 and 52 intersect at a point 54 generally opposite from finger 42. These ramps serve a biasing function as discussed further below. Dual finger cancel pawl 24 also has a shaft 56 which extends away from the main body and perpendicular to it on which the cancel pawl 24 pivots. A generally triangular shaped recess 58 extends through dual finger cancel pawl 24 rearwardly of shaft 56.

In the disclosed embodiment, a portion of the forward outer periphery of front base cover 22 is arc shaped to receive the outer circumference of a cancelling cam 60. Cancelling cam 60 includes a shoulder 62 which selectively contacts one of fingers 40 and 42 when the turn signal cancel mechanism is in an operational position (this can be seen in FIG. 5). Cancelling cam 60 is associated with the steering assembly and rotates when the steering assembly rotates. In the preferred embodiment, cancelling cam 60 is a pair of protrusions which have rounded edges. Cancelling cam 60 does not contact either one of fingers 40 and 42 when the turn signal mechanism is in the neutral position (this can be seen in FIG. 2).

Cancel pawl 24 is illustrated in FIG. 2 within a cancel pawl enclosure 64. Enclosure 64 has a generally rectangular protrusion 66 extending rearwardly away from the main body of the cancel pawl enclosure for housing a biasing spring 72, (FIG. 4). Enclosure 64 also includes a lower slot 68 and an upper slot 70 in which shaft 56 is inserted. Spring 72, as shown in FIG. 4, contacts the rearward outer periphery of cancel pawl 24. Spring 72 biases cancel pawl 24 toward the outermost forward position of lower slot 68 and upper slot 70, as shown. It also biases the position of fingers 40 and 42. When rotated from neutral to one of two operational positions, for either a right or left turn, only slight movement is required before the existence of one of the pair of ramps 44 and 46 or 50 and 52 bias the spring so that it favors resting at point 48 or 54, respectively. Since each point is generally opposite a finger, the appropriate finger extends outwardly from the cancel pawl mechanism at the proper position.

In the disclosed embodiment, front base cover 22 has two cylindrical dowels 74 and 76 whose outer diameters are slightly smaller than holes 78 and 80 of pawl enclosure 64. Dowels 74 and 76 are inserted into holes 78 and 80 respectively in order to position and secure pawl enclosure 64 to front base cover 22. Thus, the cancel pawl enclosure with the enclosed cancel pawl is easily assembled to the front base cover. It should be appreciated that the dowels are a suggested securing means and that other securing means are clearly within the scope of the invention. Front base cover 22 also includes two outer spring rests 82 and 84.

Figure 3:
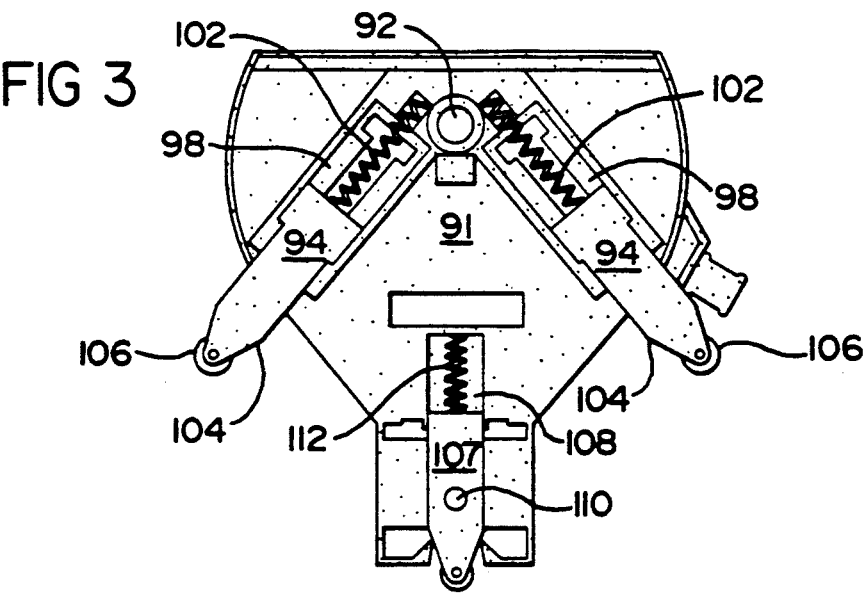
FIG. 3 is an end view of the turn signal pivot mechanism according to the present invention.

FIG. 3 illustrates the bottom of a turn signal pivot mechanism 91. Turn signal pivot mechanism 91 is placed in an operational position through the pivoting action of the turn signal arm by the vehicle operator, using shaft 92 as a pivot point. Shaft 92 pivots within opening 90 of cover 22. Turn signal pivot mechanism 91 includes two restoring plungers 94 which are each retained within a slot 98. Each restoring plunger 94 includes a spring 102 and a body 104 with a roller 106 at an outer end that engages spring rests 82 or 84. Restoring plungers 94 generally bias turn signal pivot mechanism 91 to its normal or non-signalling position.

Latching plunger 107 is retained within slot 108 and has pin 110 extending perpendicularly away from slot 108. Spring 112 biases latching plunger 107 forwardly and outwardly of turn signal pivot mechanism 91. With reference to FIG. 4, pin 110 of latching plunger 107 is received in upper slot 70 of pawl enclosure 26 and recess 58 of cancel pawl 24 to operationally couple turn signal pivot mechanism 91 and cancel pawl 24.

In the disclosed embodiment, a latching form 117 is provided and fits within back insert housing 26. Latching form 32 has two outer tapered wedges 118 which correspond to slots 119 formed within back insert housing 26. Wedges 118 prevent latching form 117 from being improperly inserted into back insert housing 26. Latching form 117 includes two ramps 120 extending laterally outwardly at an angle from a center point along the rear. At the end of each of ramps 120 is a ledge 124. When the turn signal is activated for a turn by rotating turn signal pivot mechanism 91, the outer edge of latching plunger 107 moves along one of ramps 120 and snaps into position at ledge 124, despite the resisting force of restoring plungers 94. Simultaneously, pin 110 rotates dual finger cancel pawl 24. As explained above, cancel pawl 24 is biased so that only a limited amount of rotation is required before a finger 40 or 42 is rotated to its actuated position.

Figure 5:
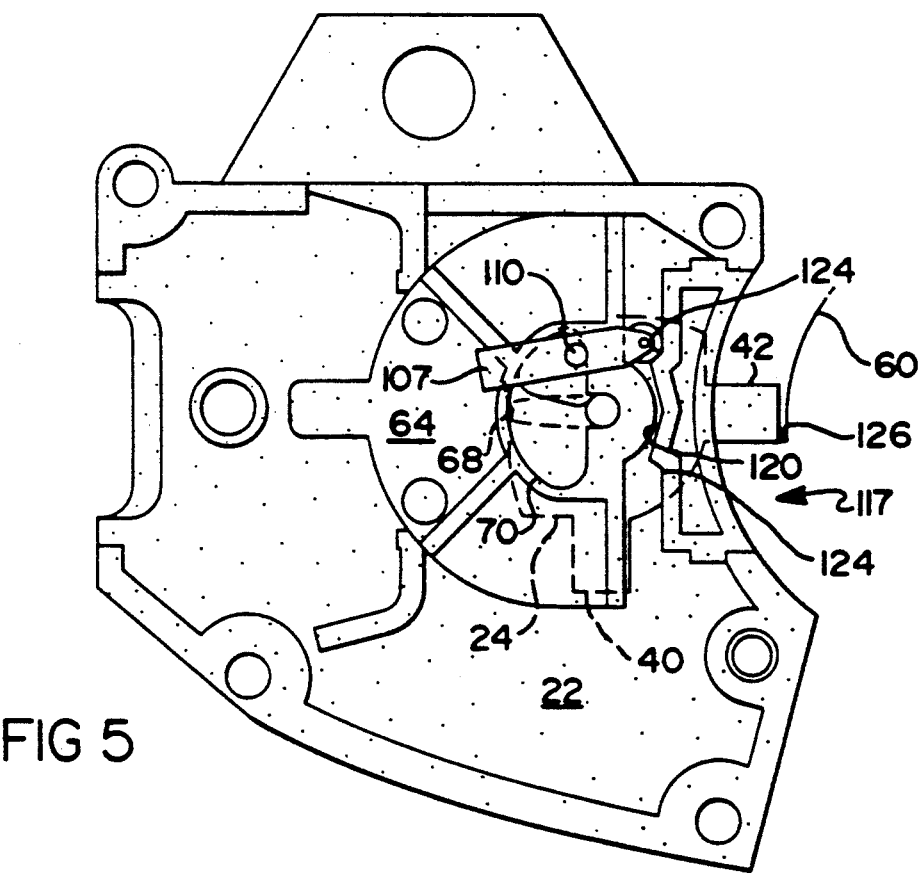
FIG. 5 is a view of a portion of the present invention showing the improved turn signal cancel mechanism in an actuated position.

When turn signal pivot mechanism 91 is pivoted, as shown in FIG. 5, pin 110 of latching plunger 107 rotates dual finger canceling pawl 24. As explained above with respect to FIG. 2, the cancelling pawl 24 is biased so that the appropriate finger 40 or 42 rotates outwardly to its activated position. Despite this bias, however, if it were not for the interaction between latching plunger 107 and latching form 117, restoring plungers 94 would rotate turn signal pivot mechanism 28 back to its neutral position. Because of the action of pin 110, finger 40 or 42 would also rotate back to its neutral position, the position illustrated in FIG. 2. Instead, latching plunger 107 and latching form 117 selectively maintain turn signal cancel mechanism 20 in its selected operational position, as shown.

After activating the signal mechanism, signal mechanism pivot mechanism 91 returns to its neutral position in one of two ways. First, the turn signal pivot mechanism may be manually rotated to overcome the resistance provided by latching plunger 107 in conjuction with ledge 124. The restoring plungers rotate the signal pivot mechanism back to a neutral position. Simultaneously, pin 110 of latching plunger 107 rotates finger 42 counter-clockwise back to its neutral position. Second, when the turn is complete, shoulder 126 of cancelling cam 60 comes in contact with and rotates finger 40 or 42 in the cancelling direction. Recess 58 contacts pin 110 of latching plunger 107 and dislodges or moves latching plunger 107 away from ledge 124. Signal arm pivot mechanism 91 is then rotated back to its neutral position by the restoring plungers 94.

Alternatively, shoulder 126 of cancelling cam 60 may rotate the finger in the appropriate direction. When making the turn with the turn signalled, the steering wheel is turned in the desired direction which will not cause the cancelling pawl 24 to deactivate the turn signal. Shoulder 126 of cancelling cam 60 slightly rotates finger 40 or finger 42 while simultaneously forcing dual finger cancel pawl 24 inwardly along lower slot 68 and upper slot 70 of pawl enclosure 64. Recess 58 of dual finger cancel pawl 24 is shaped to allow this movement without interference from pin 110 of latching plunger 107.

A preferred embodiment of the present invention has been disclosed. A worker of ordinary skill in the art would realize, however, that certain modifications would fall within the teaching of this invention. Thus, the following claims should be studied in order to determine the true scope and content of the invention.

I claim:

1. A turn signal mechanism for controlling the turn signal indicators of a vehicle, said turn signal mechanism comprising:

a pivot assembly adapted to be pivotally mounted with respect to a vehicle steering assembly and adapted to receive a turn signal arm for manual movement of said pivot assembly between a normal position and signalling positions;

restoring means for restoring said pivot assembly to said normal position;

latching means for holding said pivot assembly in each of said signalling positions;

cancelling means for releasing said latching means so that said pivot assembly can be restored to said normal position by said restoring means, said cancelling means including a cancel pawl having first and second cancelling fingers that are adapted to be engaged by said steering assembly, said cancelling fingers being pivotally mounted for pivotal movement between first and second positions corresponding to said signalling positions and a third position corresponding to said normal position;

said pivot assembly and said cancelling means being operatively coupled such that when said pivot assembly is latched in one of said signalling positions, one of said cancelling fingers is pivoted to said first or second position and adapted to be engaged by said steering assembly to subsequently release said latching means as said steering assembly is operated so that said pivot assembly and said cancelling fingers can be restored to said normal position, wherein said cancel pawl is pivotally secured to said turn signal mechanism and includes a recess for receiving a pin extending from said latching means and said latching means extends from said turn signal pivot mechanism such that said cancel pawl and said pivot mechanism are operationally coupled, wherein the outer periphery of said cancel pawl includes a first pair of arc shaped ramps intersecting at a first point generally opposite said first finger and a second pair of arc shaped ramps intersecting at a point generally opposite said second finger, biasing means for biasing said cancel pawl outwardly and for positioning one of said first and second fingers into said first and second positions when said pin of said latching means comes into contact with a wall of said recess of said cancel pawl.

2. A mechansim as recited in claim 1, wherein said first finger of said cancel pawl is disposed approximately at right angles to said second finger of said cancel pawl.

3. A mechanism as recited in claim 1, wherein said biasing means biases said cancel pawl to an outermost position with respect to said mechanism for contact with said steering assembly, said cancel pawl being capable of retracting inwardly into said mechanism and each of said cancelling fingers being capable of rotating inwardly into said mechanism.

4. A mechanism as recited in claim 3, wherein said cancel pawl is secured within an enclosure, said enclosure including a slot for receiving said pin extending from said latching means to operatively couple said cancel pawl and said pivot assembly.

5. A mechanism as recited in claim 1, wherein said restoring means includes a pair of spring biased restoring plungers, each of said plungers having one end engaging said pivot assembly and free ends engaging a fixed based, said plunger biasing said pivot assembly to said normal position.

6. A mechanism as recited in claim 1, wherein said latching means includes a latching plunger having an outer end in contact with a control surface, said control surface including an outer periphery with a first and second ramp extending laterally outwardly at an angle from opposite sides of a center point with a ledge at the outer edge of each said ramp, said latching plunger being disposed in one said ledge when said pivot assembly is in said one of two operational positions.

7. A mechanism for controlling vehicle turn signals, said vehicle including a steering assembly having an engaging member thereon, said mechanism comprising:
   a turn signal pivot member adapted to receive a turn signal arm for manual rotation of said pivot member between a normal position, wherein said vehicle turn signals are not operational, and first and second operational positions, wherein said vehicle turn signals are activated;
   a latching plunger protruding from said pivot member and engaging a control surface, said latching plunger cooperating with said control surface to hold said pivot member in said first and second positions after manual rotation to either of said first and second positions,
   a dual finger cancel pawl pivotally mounted to said mechanism and operatively coupled to said latching plunger, said dual finger cancel pawl including spaced first and second fingers selectively engagable by said engaging member to rotate said cancel pawl with respect to said mechanism to release said pivot member from said first and second operational positions and return said pivot member to said normal position, wherein said cancel pawl is pivotally secured and includes a recess for receiving a pin extending from said latching plunger and said latching plunger extends from said turn pivot member such that said cancel pawl and said pivot member are operationally coupled.

8. A mechanism as recited in claim 7, wherein the outer periphery of said dual finger cancel pawl includes a first pair of arc shaped ramps intersecting at a first point generally opposite said first finger and a second pair of arc shaped ramps intersecting at a point generally opposite said second finger, biasing means for biasing said cancel pawl outwardly and for positioning one of said first and second fingers into said first and second positions when said pin of said latching plunger comes into contact with a wall of said recess of said dual finger cancel pawl.

9. A mechanism as recited in claim 8, wherein said biasing means biases said dual finger cancel pawl to an outermost position with respect to said mechanism for contact with said steering assembly, said dual finger cancel pawl being capable of retracting inwardly into said mechanism and each of said cancelling fingers being capable of rotating inwardly into said mechanism.

10. A mechanism as recited in claim 7, further including at least one restoring plunger urging said pivot member to said normal position.

11. A turn signal control mechanism for use in controlling a vehicle's turn signals, said mechanism comprising:
   a pivotal member manually rotatable between a normal position, wherein said turn signals are not operational and operational positions wherein said turn signals are activated;
   a latching plunger for holding said pivotal member in each of said signalling positions;
   a dual finger cancel pawl operationally coupled to said pivotal member to return said pivotal member from one of said operational positions to said normal position after said vehicle has been turned in the desired direction, said cancel pawl being pivotally mounted such that said dual fingers can rotate between three positions corresponding to said normal and first and second operational position, said pawl having a recess for receiving a pin extending from said latching plunger.

12. A mechanism as recited in claim 11, wherein the outer periphery of said dual finger cancel pawl includes a first pair of arc shaped ramps intersecting at a first point generally opposite said first finger and a second pair of arc shaped ramps intersecting at a point generally opposite said second finger, biasing means for biasing said cancel pawl outwardly and for positioning one of said first and second fingers into said first and second positions when said pin of said latching plunger comes into contact with a wall of said recess of said dual finger cancel pawl.

13. A mechanism as recited in claim 12, wherein said biasing means biases said dual finger cancel pawl to an outermost position with respect to said mechanism for contact with said steering assembly, said dual finger cancel pawl being capable of retracting inwardly into said mechanism and each of said cancelling fingers being capable of rotating inwardly into said mechanism.

14. A mechanism as recited in claim 11, further including restoring means for restoring said pivot member to said normal position and a latching means for holding said pivot member in said operational positions.

15. A mechanism as recited in claim 14, wherein said restoring means includes a pair of spring biased restoring plungers, each of said plungers having one end engaging said pivot assembly and free ends engaging to a fixed base, said plungers biasing said pivot assembly to said normal position.

16. A mechanism as recited in claim 15, wherein said latching means includes a latching plunger having an outer end in contact with a control surface, said control surface including an outer periphery with a first and second ramp extending laterally outwardly at an angle from opposite sides of a center point with a ledge at the outer edge of each said ramp, said latching plunger being disposed in one said ledge when said pivot assembly is in said one of two operational positions.

17. A mechanism as recited in claim 11, wherein the dual finger cancel pawl includes a pair of spaced fingers, said spaced fingers having a neutral position when said pivotal member is in said normal position with said neutral position corresponding to said spaced fingers being angled outwardly from a longitudinal center line of said mechanism.

* * * * *